(No Model.)

C. H. SCHULTZ, Jr., Dec'd.
C. H. SCHULTZ, Administrator.
FILTER.

No. 517,488. Patented Apr. 3, 1894.

WITNESSES:

INVENTOR
Carl H. Schultz, Jr.,
BY
Briesen & Knauth,
ATTORNEYS.

UNITED STATES PATENT OFFICE.

CARL H. SCHULTZ, JR., OF NEW YORK, N. Y.; CARL H. SCHULTZ ADMINISTRATOR OF CARL H. SCHULTZ, JR., DECEASED.

FILTER.

SPECIFICATION forming part of Letters Patent No. 517,488, dated April 3, 1894.

Application filed October 11, 1892. Serial No. 448,522. (No model.)

*To all whom it may concern:*

Be it known that I, CARL H. SCHULTZ, Jr., a citizen of the United States, residing at New York, in the county and State of New York, have invented a new and useful Improvement in Filters, of which the following is a full, clear, and exact description, reference being had to the accompanying drawings, forming part thereof, in which—

Figure 1:
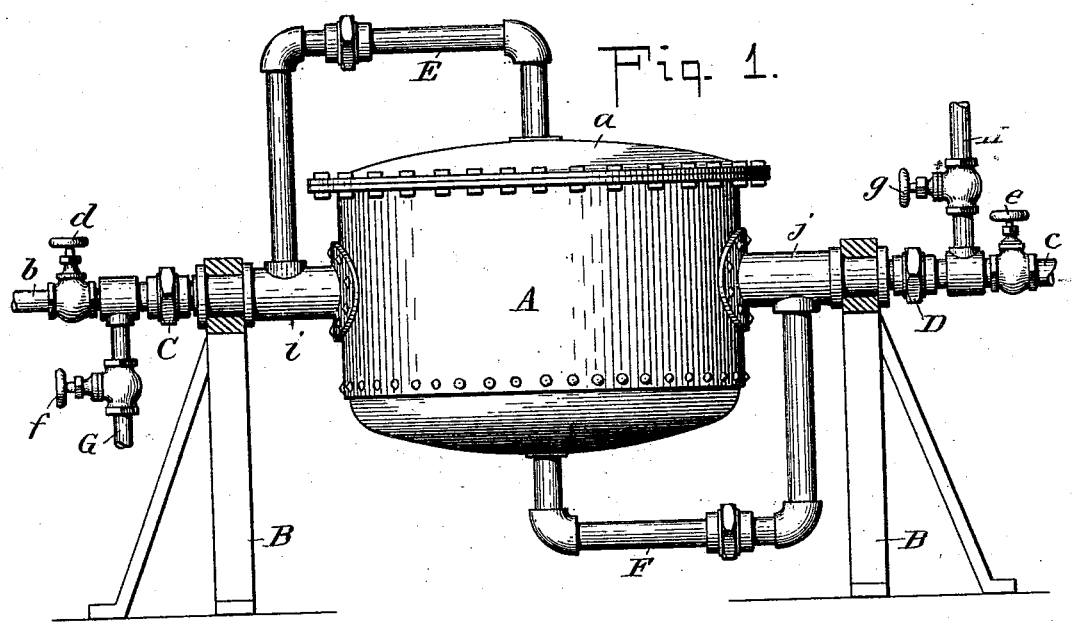
Figure 2:
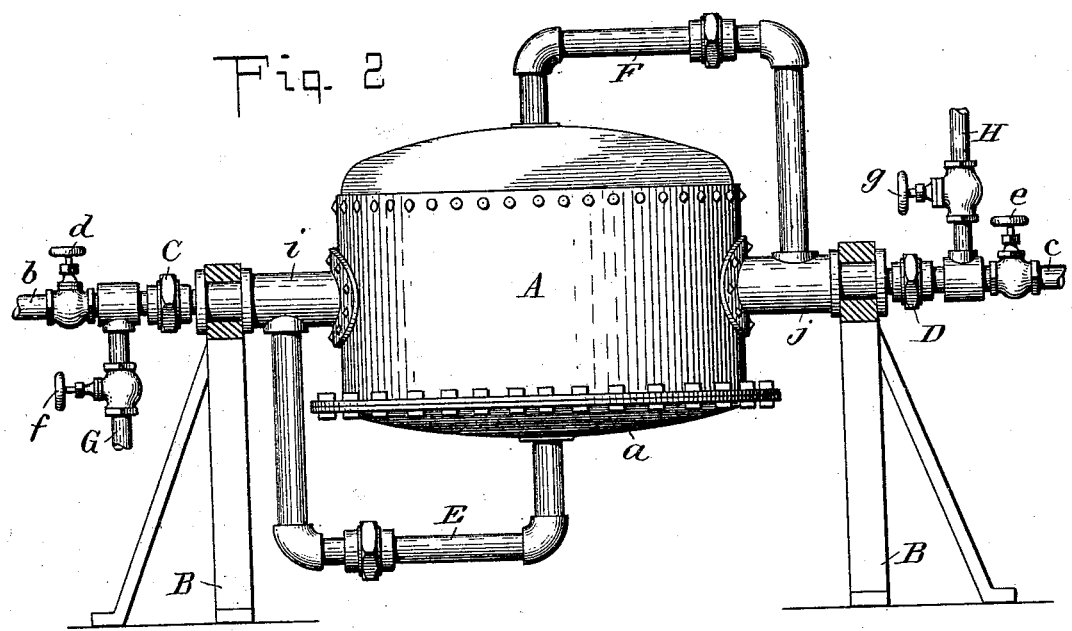

Figure 1 is a side elevation of my improved filter in operative position. Fig. 2 is a side elevation of my improved filter reversed, or in position for cleaning.

My invention relates to filters, and consists in the arrangement and combination of parts hereinafter described and specifically set forth in the claim.

The object of my invention is to produce a filter which can be quickly and thoroughly cleansed with but very little trouble and loss of time, and without disconnecting the parts, in a manner which overcomes certain objections to devices heretofore used.

My improved filter consists of a vessel A which hangs by hollow trunnions $i$ and $j$ in the frame B. The inner ends of these trunnions are closed, as their bore is not to communicate with the vessel at their points of connection. The cover $a$ of the vessel A is bolted down with heavy bolts as shown, or otherwise secured.

C and D are couplings which connect the trunnions with the stationary water supply and discharge pipes $b$ and $c$, which are provided with valves $d$ $e$, respectively, the object of which valves is to control the supply and discharge of the water to and from the filtering vessel A.

Connected to the respective hollow trunnions and forming a source of communication between them and the vessel A, are the inlet and outlet pipes E and F, said inlet-pipe E leading to and communicating with the vessel A at the upper portion thereof, as in Fig. 1, and the outlet pipe F leading from and communicating with the lower portion of said vessel.

Communicating with the supply-pipe $b$ is a blow-off G controlled by a valve $f$.

Placed in communication with the discharge-pipe $c$ is a steam inlet-pipe H, which is controlled by a suitable valve $g$, the purposes of all of which will be hereinafter described.

Having described the details of my improved filter, I will now proceed to describe one operation thereof. The filter being in the position shown in Fig. 1, with the valves $f$ $g$ closed, and the valves $d$ $e$ open, the water or other liquid to be filtered flows through the pipe $b$, hollow trunnion and pipe E into the top of the filter A, whence it descends through the filtering material contained in vessel A, and flows as filtered liquid through the outlet-pipe F, hollow trunnion, and finally through the discharge pipe $c$. The filtering process continues in this way until the accumulation of impurities caught by the filtering material necessitates its cleaning, when the valves $d$ and $e$ are closed, and the filter then turned bottom side up on its trunnions, as in Fig. 2. When this is accomplished, the valve $f$ of the blow-off pipe G and the valve $g$ of the steam inlet-pipe H are opened, thereby admitting steam through the pipe F into the filtering material from above, thus forcing all accumulated matter through the pipe E and finally out through the blow-off pipe G. This injection of steam or equivalent cleansing fluid may be alternated with a supply of filtered liquid obtained by closing the steam inlet valve $g$ and opening the valve $e$ of the discharge pipe $c$, thereby allowing the desired amount of filtered liquid to run back into the filtering vessel A, it being understood that the point of final discharge of the filtered liquid is by preference above the filter. When sufficient filtered liquid has flowed into the vessel A, the valve $e$ is again closed and the valve $g$ of the steam inlet-pipe H again opened, admitting steam into the vessel A until the mass contained therein reaches the desired temperature, which is about 212° Fahrenheit. The steam will force the liquid together with the remaining impurities from the filtering material out through the blow-off pipe G. This action may be repeated as often as thought desirable, though in practice it has been found that once is sufficient and it will be seen that not only will the filtering material be cleaned, but also the pipes connected with the filter between the inlet and outlet valves. After the cleansing has been accomplished as above described, the filter is turned back into the position shown in Fig. 1, when it is again ready to filter.

It will be observed that both the liquid to be filtered and the steam injected are received from above the filtering mass, and at the same time the steam is injected in an opposite direction to the flow of the liquid to be filtered, thus forcing out the impurities. This I consider of great advantage over filters heretofore used wherein the liquid to be filtered or the water for cleansing purposes, or both, were forced up through the filtering material. When it is desired to renew the filtering material it is simply necessary to remove the cover $a$ of the vessel A, invert said vessel and the filtering material will be discharged, the filter being then ready to receive a new supply.

I am enabled by my invention to quickly and thoroughly clean the filtering material without disconnecting any of the parts, and to readily remove said filtering material when it is no longer fit for use.

The cleansing of the filter and its filtering material by the use of steam and filtered boiling water has many advantages over other methods of cleansing heretofore used, since the steam and hot water dissolves any slimy matter that may have formed on the filter, or the filtering material and which it would be almost impossible to remove by any other means and kills all bacteria formed on the filter, thereby thoroughly sterilizing it. The filtered water washes and carries off the refuse matter or dirt without depositing more dirt in said filtering material, leaving it in a clean sweet condition, the whole cleansing process occupying but a few minutes.

Many changes in detail might be made without departing from the spirit of my inventions, such as changing the means for conveying the filtered water back into the vessel for the purposes of cleaning, the method described being preferred, however, because of its simplicity.

Instead of forcing steam through the filtering material from the pipe H, I may use water, but I find that much better results are obtained from the use of steam. It will be observed that the heads of the filter cylinder A are absolutely closed, except where they connect with the inlet and outlet-pipes E, F.

Having described my invention, what I claim, and desire to secure by Letters Patent, is—

The combination of a revoluble filter-body A with the revoluble inlet-pipe E, stationary supply-pipe $b$ communicating therewith, and blow-off pipe G also communicating therewith, and with the revoluble outlet-pipe F communicating with the filter-body A, and with the discharge-pipe $c$ and steam inlet-pipe H, all arranged for alternately filtering, and cleansing and sterilizing, while the filter-body is in a stationary position, the filter-body having its ends closed, except where it admits the inlet and outlet-pipes E F, as and for the purpose described.

CARL H. SCHULTZ, JR.

Witnesses:
HARRY M. TURK,
CHARLES E. SMITH.